United States Patent [19]
Gallagher et al.

[11] Patent Number: 5,644,786
[45] Date of Patent: Jul. 1, 1997

[54] METHOD FOR SCHEDULING THE EXECUTION OF DISK I/O OPERATIONS

[75] Inventors: Michael J. Gallagher; Ray M. Jantz, both of Wichita, Kans.

[73] Assignees: AT&T Global Information Solutions Company, Dayton, Ohio; Hyundai Electronics America, San Jose, Calif.; Symbios Logic Inc., Fort Collins, Colo.

[21] Appl. No.: 610,633

[22] Filed: Nov. 8, 1990

[51] Int. Cl.[6] .................................................. G06F 9/312
[52] U.S. Cl. .................. 395/850; 395/826; 395/853; 395/851; 395/874; 395/439
[58] Field of Search ................................. 395/275, 425, 395/650; 364/200 MS, 252.1, 243.2, 238.3, 248.1, 964.4, DIG. 1

[56] References Cited

U.S. PATENT DOCUMENTS

| | | | |
|---|---|---|---|
| 3,623,006 | 11/1971 | Balakian et al. | 364/DIG. 1 |
| 3,702,462 | 11/1972 | England | 395/275 |
| 4,403,286 | 9/1983 | Fry et al. | 364/DIG. 1 |
| 4,604,687 | 8/1986 | Abbott | 364/DIG. 1 |
| 4,680,703 | 7/1987 | Kriz | 364/DIG. 1 |
| 4,831,541 | 5/1989 | Eshel | 364/DIG. 1 |
| 4,858,108 | 8/1989 | Ogawa et al. | 395/826 |
| 4,875,155 | 10/1989 | Iskiyan et al. | 395/440 |
| 4,888,691 | 12/1989 | George et al. | 395/700 |
| 4,901,232 | 2/1990 | Harrington et al. | 395/826 |
| 4,949,245 | 8/1990 | Martin et al. | 364/DIG. 1 |
| 4,979,108 | 12/1990 | Crabbe, Jr. | 364/DIG. 1 |
| 5,140,683 | 8/1992 | Gallo et al. | 395/425 |

OTHER PUBLICATIONS

"Shadowing Boosts System Reliability" by Bates et al. Computer Design; Apr. 1985.
"Arm Scheduling in Shadowing Disks" by Bitton IEEE Comp Con 1989; Feb. 27, 1989–Mar. 3, 1989.

*Primary Examiner*—Tod R. Swann
*Assistant Examiner*—J. Peikari
*Attorney, Agent, or Firm*—James M. Stover; Wayne P. Bailey

[57] ABSTRACT

A procedure for scheduling multiple process requests for read/write access to a disk memory device within a computer system. The procedure considers disk characteristics, such as the number of sectors per track, the number of tracks per cylinder, speed of disk rotation and disk controller queuing capability in determining the optimal order for executing process requests. Process requests are placed in packets within an execution queue, each packet including up to a predetermined maximum number of requests. Within the packets, the process requests are sorted in ascending/descending order by the cylinder number to which the requests desire access, while within each cylinder the requests are placed in next-closest-in-time sequence.

7 Claims, 5 Drawing Sheets

METHOD FOR SCHEDULING THE EXECUTION OF DISK I/O OPERATIONS

The present invention relates to magnetic disk storage units and, more particularly, to a method for ordering disk operations to optimize disk I/O throughput.

BACKGROUND OF THE INVENTION

Operating systems for many present day computer systems include multiprogramming and multitasking procedures in order to provide more efficient utilization of the processing capabilities of the system. These procedures interleave several jobs or processes so that as soon as the system processor becomes idle, such as when the process in execution enters an input/output (I/O) activity, another process is executed by the processor. However, with several, possibly many processes executing concurrently, more than one process may request access to the same I/O device. Contention between processes for use of I/O devices, such as printers and memory storage devices, is also common in computer networks wherein I/O devices are shared by many users, and in parallel processing systems.

I/O scheduling is performed by the system processor, or by processors associated with the individual I/O devices, to provide orderly execution of multiple requests for utilization of I/O devices. The scheduler maintains a queue for each I/O device wherein processes waiting to use the I/O device are stacked. The order in which process requests are stacked and executed may vary from the order in which the requests are received by the scheduler in order to make the most efficient use of the I/O device or to provide preferential scheduling of higher priority requests.

Several scheduling methods are known for optimizing data retrieval and storage operations for disk drives and stacked disk drives. These methods seek to minimize access time between process requests, (or "functions") involving data stored at different locations on the disk or disk stack. Access time delays inevitably result due to the manner in which data is organized on the disk and the mechanics of accessing that data.

Data is organized on the surface of a magnetic disk as shown in FIG. 1. The disk drive unit includes a circular disk 102 having its surface coated with a magnetizable material and a read/write head 104 attached to a movable arm 106. Data is recorded onto the disk in a concentric set of rings T0 through T3, called tracks. Arm 106 is movable in the directions indicated by arrows 108 to position head 104 over any one of tracks T0 through T3. Each track is seen to be divided into sections identified as sectors, wherein blocks of data are stored. The sectors corresponding to tracks T0, T1, T2 and T3 have been numbered S0 through S9, S10 through S19, S20 through S29, and S30 through S39, respectively. A second read/write head, not shown, may be provided to provide access to the bottom surface of disk 102.

A disk stack, shown in FIG. 2, consists of multiple disks 202 through 208 affixed to a common shaft or spindle 220. Each disk is similar in construction to disk 102 of FIG. 1. Multiple read/write heads H1 through H7 provide access to disk surfaces 202A, 202B, 204A, 204B, 206A, 206B, 208A and 208B, respectively. The heads are moved in unison in the directions indicated by arrows 210 to locate corresponding tracks on each disk. The corresponding concentric tracks on disks 202 through 208 are referred to as cylinders.

The disk or disk stack is rotated at constant speed during operation. To read or write information, the read/write head must be positioned contiguous to the desired track and at the beginning of the sector to be accessed. Access time includes the time it takes to position the head at the desired tract or cylinder, known as seek time, and the time it takes for the head to line up with the sector to be accessed, known as rotational latency. Seek time can be eliminated by providing a fixed head for each track. Track selection for a fixed head system involves electronically selecting the proper head.

According to one method for optimizing disk drive operations, identified as the "elevator sweep" method, processes requesting access to disk storage are collected, sorted and then queued in an ascending/descending order by sector number. Thus, process requests are executed as the read/write head first sweeps up the disk and then down it. Seek time is reduced as successively executed requests call for access to sectors closely located on the magnetic disk. Thus, excessive head movement is reduced. However, such a method is unfair in that operations requiring access to sectors located at either extreme of the elevator sweep, such as the innermost and outermost tracks on a single disk, are executed less frequently than operations requiring access to sectors located in the middle of the elevator sweep.

According to another "modified elevator sweep" method, process requests are sorted and queued in strictly ascending order by sector number. The queue has a direction, up or down, and a maximum reverse count associated with it. The method selects the next request to execute by determining which is next closest by sector number. To limit movement in the direction opposite the queue direction a counter is incremented whenever the next request is in the direction opposite the queue direction. When the counter value exceeds the maximum reverse count, the next request in the queue's direction is selected for execution. The counter is zeroed whenever a request in the queue's direction is selected. The queue direction is reversed whenever the start or end of the queue is encountered. This method also suffers from unfairness as process requests requiring access to sectors located far from the current head position may take a long time to execute.

In accordance with another scheduling method, requests are queued into packets. Within the packets, the requests are sorted in ascending order by sector number. Requests are executed in a "sawtooth" manner as the read/write head sweeps up the disk executing process requests contained in a first packet and is then returned to the "bottom" of the disk to begin a sweep for the next packet.

In addition to the disadvantages of the disk operation scheduling methods discussed above, none of the above-discussed scheduling methods effectively lessens delays due to rotational latency. Furthermore, all of the above-discussed methods are hampered by using only logical block address for request re-ordering causing them to miss optimization opportunities that could be realized by considering disk geometry in the scheduling process.

OBJECTS OF THE INVENTION

It is therefore an object of the present invention to provide a new and improved method for scheduling process requests for access to disk storage devices.

It is another object of the present invention to provide such a method providing more efficient utilization of disk storage devices.

It is yet another object of the present invention to provide a new and improved method for scheduling computer system requests for access to disk storage wherein disk geometry is considered in the scheduling process.

It is a further object of the present invention to provide a new and improved method for optimizing disk input/output operations wherein I/O requests concerning contiguous sectors are presented to the disk device as a single function.

SUMMARY OF THE INVENTION

There is provided, in accordance with the present invention, a method for scheduling multiple process requests for read/write access to a disk memory device within a computer system. The method optimizes disk utilization by determining the disk access times separating each pairing of process requests or functions. These disk access times are then compared to the function return time of the disk device. The process requests are thereafter placed in a queue for execution in a "next-closest-in-time" sequence, wherein successively queued requests are separated by the minimum disk access time which exceeds the function return time.

In the described embodiment, process requests are first sorted and queued in ascending order by the disk sector number to which the requests desire access. The requests are read from the first queue and grouped into packets within a second queue, each packet including up to a predetermined maximum number of requests. Within the packets, the process requests are sorted in ascending/descending order by the cylinder number to which the requests desire access, while within each cylinder the requests are placed in next-closest-in-time sequence.

The above and other objects, features, and advantages of the present invention will become apparent from the following description and the attached drawings.

DETAILED DESCRIPTION OF THE PREFERRED EMBODIMENT

Figure 1:
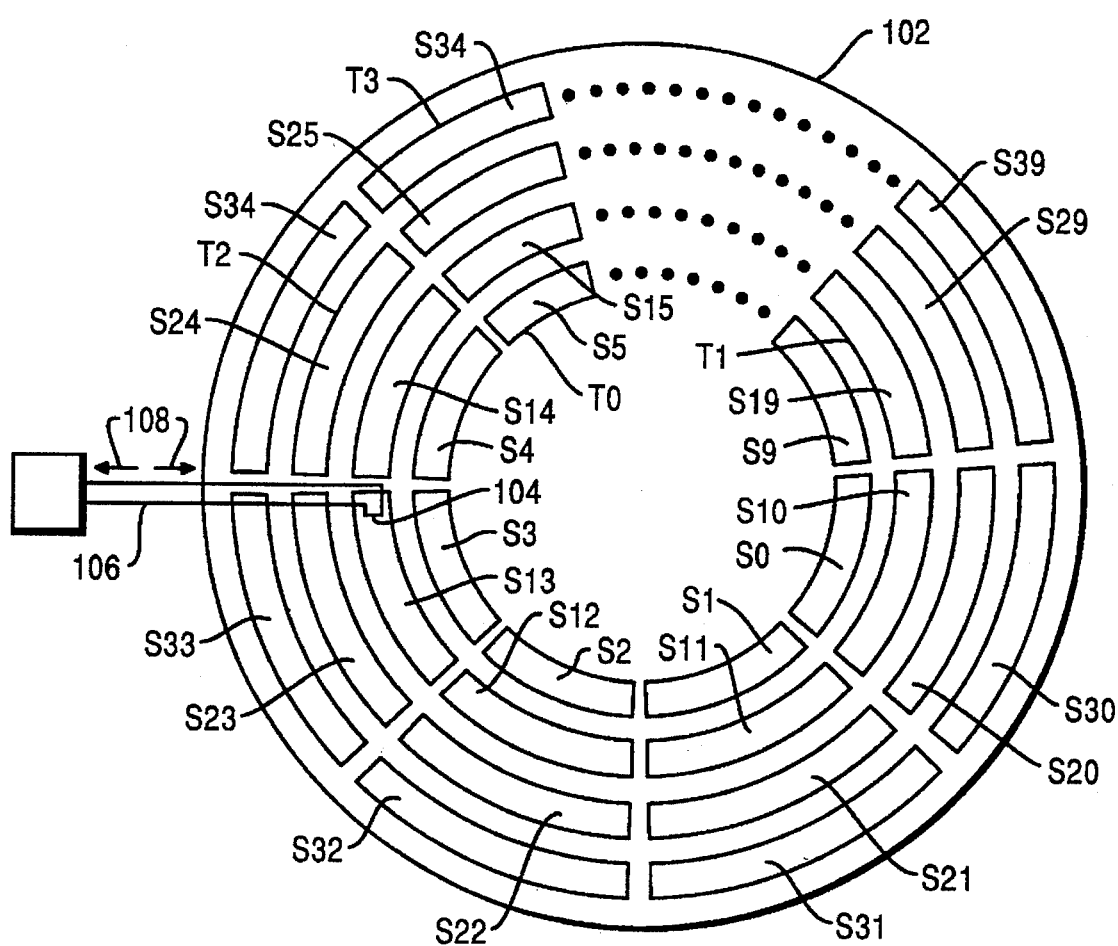
FIG. 1 is a top view of a magnetic disk illustrating the organization of data on the surface of the disk.
Figure 2:
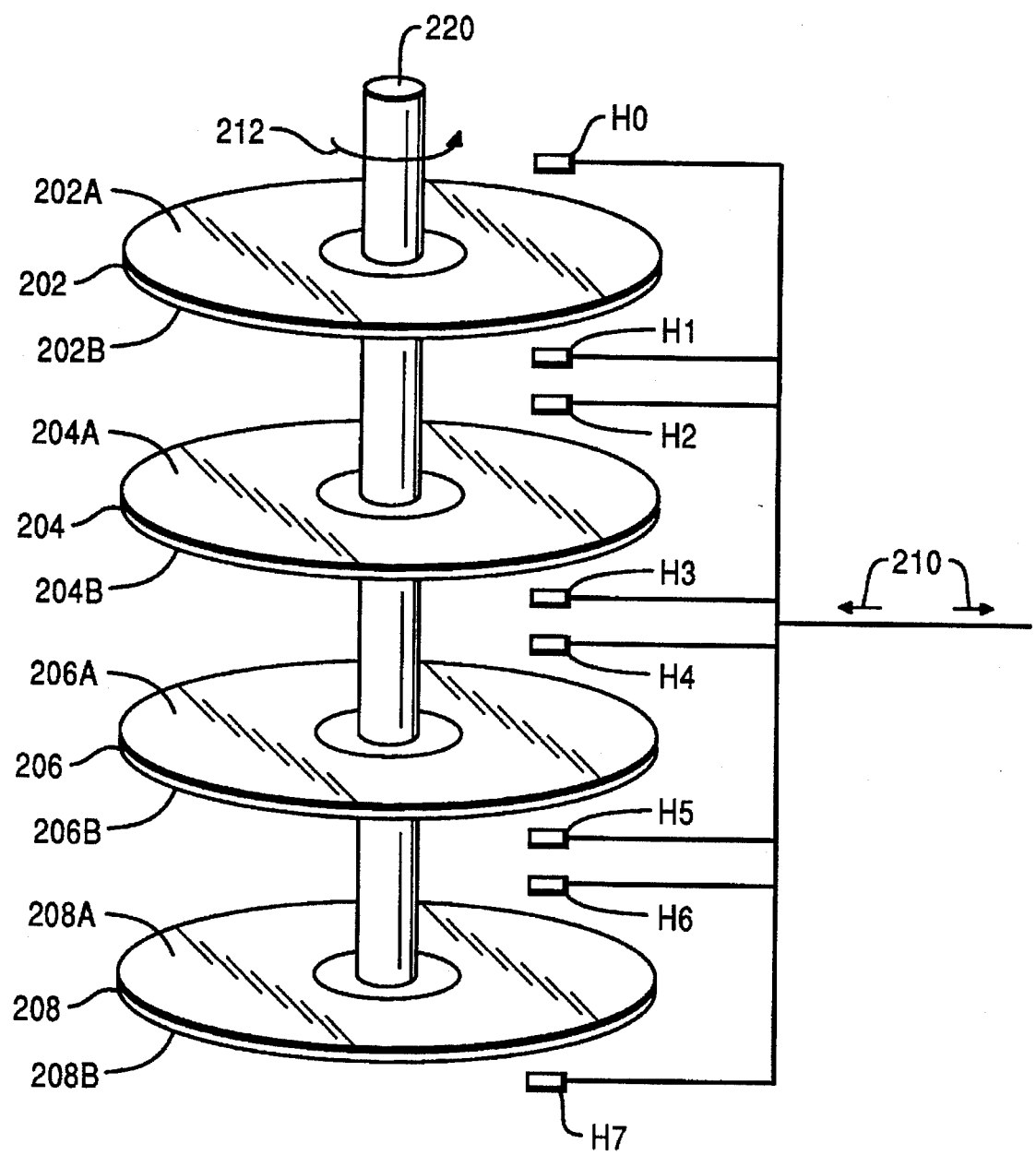
FIG. 2 is an illustration of a disk drive system including multiple platters or disks stacked on a common spindle.
Figure 3:
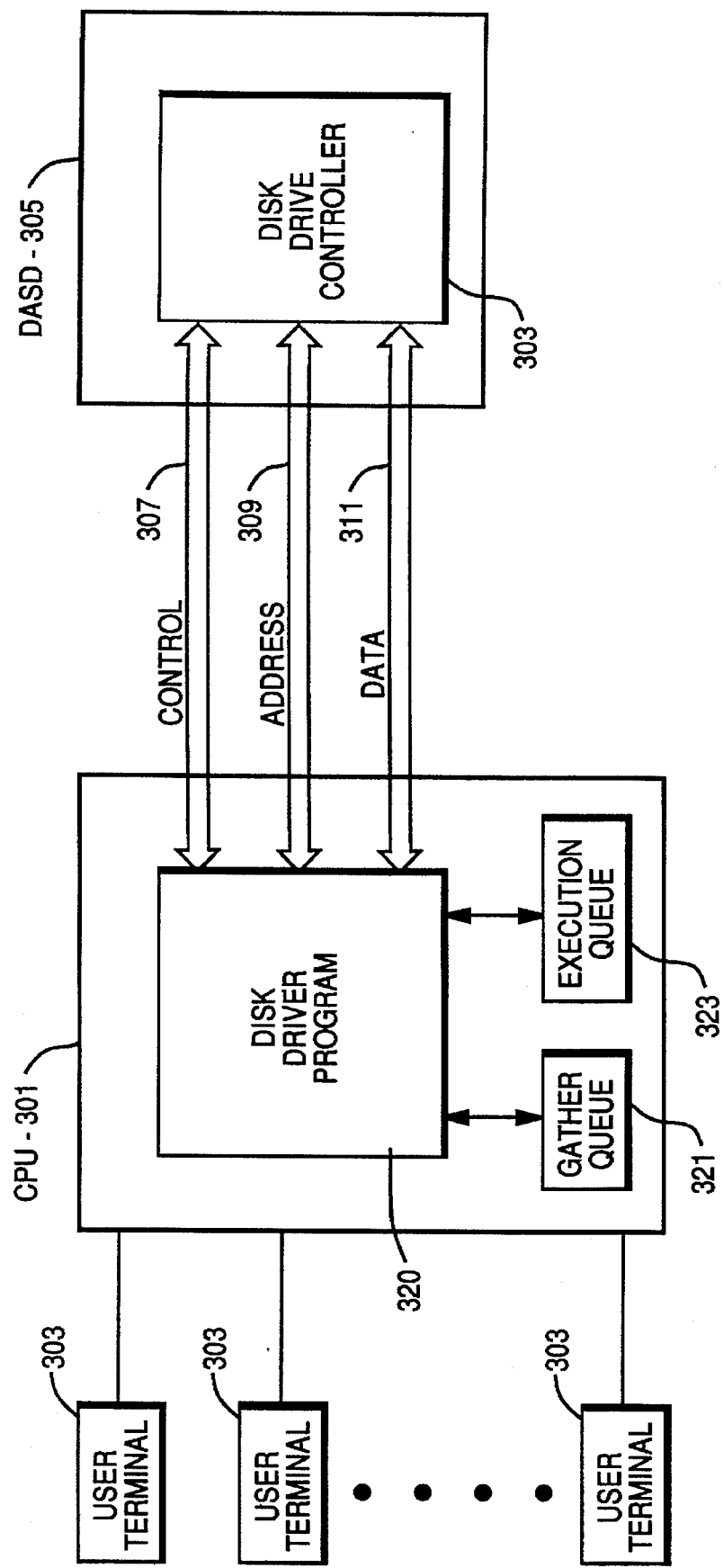
FIG. 3 is a block diagram of a computer system incorporating the present invention.

Referring now to FIG. 3, there is shown a block diagram of a computer system incorporating the present invention. The system includes a host central processor (CPU) 301 connected to communicate with a plurality of user terminals 303. CPU 301 is also connected to a direct access storage device (DASD), or disk drive unit, 305 via control, address and data buses 307, 309 and 311, respectively.

Within CPU 301, the operating system includes a disk driver program 320 which communicates through buses 307, 309 and 311 with a disk drive controller 325 associated with DASD 305. Disk driver program 320 processes read and write requests generated by the CPU or user terminals which require access to DASD 305 for execution.

The disk driver program maintains two queues 321 and 323 which are used to schedule the order in which process requests are transmitted to the controller for execution. Placement of the process requests into the queues is determined by the disk drive sector numbers to which the process requests require access, with consideration of the characteristics of the disk drive.

Process requests received by the disk driver program are gathered and placed in "gather" queue 321, in ascending order by their associated sector numbers. Requests associated with contiguous sectors, for example, first and second requests to read data stored at adjacent sectors on the same disk track, are concatenated and placed in the gather queue as a single function.

Entries in queue 321 are extracted and grouped into packets for placement in "execution" queue 323. The size of the packets may be defaulted or programmed by the user. Within the packets, requests are sorted first in ascending/descending order by the cylinder numbers of the cylinders including the process requests' "target" sectors.

Within the cylinders, the process requests are sorted in "next-closest-in-time" sequence in order to maximize the number of requests executed per disk rotation. The algorithm executed by the disk driver program to determine the optimal sequencing of the process requests within each cylinder considers disk characteristics such as the number of sectors per track, the number of tracks per cylinder, the speed of rotation of the disk, and the disk controller queuing capacity. In addition, the algorithm requires a good estimate of the "function return time" for the system. The function return time is defined as the time from the end of the controller DMA of one process request or function to the start of the DMA for the next function, including time for the transfer of the next function from the host processor to the controller.

Each request associated with a cylinder is assigned a delta t, which is the time required to position the disk drive heads at the start of the request's target sector following the completion of the immediately preceding function in the queue. The delta t for any one request is calculated by multiplying the speed of rotation of the disk with the rotational distance, i.e. the number of sectors, separating the sectors associated with that one request and the preceding queued request. The request having the lowest delta t greater than the function return time is selected as the next function in the packet. After queuing of this function the delta t's for each of the remaining requests associated with the cylinder are recalculated to determine the next succeeding function in the packet.

To provide preferential scheduling of higher priority process requests, each packet is constructed to contain requests of only one priority level. Packets having higher priority levels are placed in the execution queue ahead of lower priority packets. Concatenated requests composed of requests having different priority levels are assigned the priority level of their highest priority constituent, and placed in a packet of the appropriate priority level.

The following example is provided to illustrate the scheduling method described above. In this example, twelve requests, or functions, are to be queued for execution. The type of request (read or write), the location and length of information to be read from or written to the disk, and priority information for each request is set forth in the table which follows.

TABLE 1

| Request | Type | Sct, Length | Cyl, Trk, Sct | Priority |
|---------|-------|-------------|---------------|----------|
| 1 | Write | 0,1 | 0,0,0 | 0 |
| 2 | Write | 2,2 | 0,0,2 | 0 |
| 3 | Write | 16,2 | 0,0,16 | 1 |
| 4 | Write | 18,2 | 0,0,18 | 0 |

TABLE 1-continued

| Request | Type | Sct, Length | Cyl, Trk, Sct | Priority |
|---|---|---|---|---|
| 5 | Read | 88,2 | 0,1,39 | 1 |
| 6 | Read | 124,2 | 0,2,26 | 1 |
| 7 | Read | 220,2 | 0,4,24 | 1 |
| 8 | Read | 360,2 | 0,7,17 | 1 |
| 9 | Read | 400,2 | 0,8,8 | 1 |
| 10 | Read | 402,2 | 0,8,10 | 1 |
| 11 | Read | 404,2 | 0,8,12 | 1 |
| 12 | Read | 520,2 | 1,0,30 | 1 |

Locations are identified by absolute sector number in column 3 of the above table and also by cylinder, track within the cylinder and sector within the track (relative sector number) in column 4. Lengths in column 3 are expressed in sectors. In addition the disk device has the following characteristics:

Sectors/Track=49

Tracks/Cylinder=10

Rotational Speed=16 ms/rev (0.33 ms/sector)

Disk Queue Length=0

Function Return Time=3 ms

Figure 4:
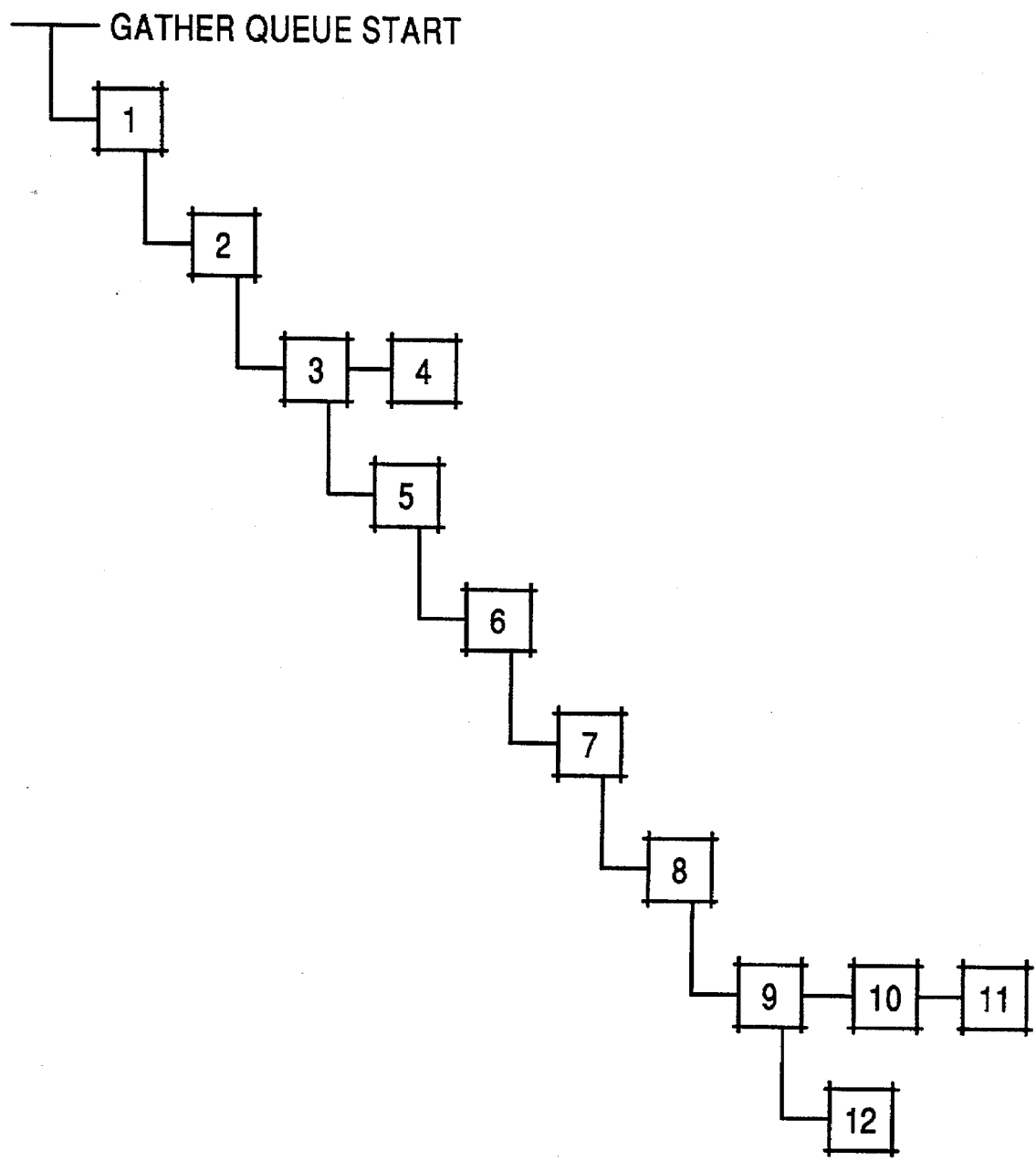
FIG. 4 illustrates the organization of disk I/O functions within a first "gather" queue in accordance with the present invention.

The organization of the process requests in the first "gather" queue is shown in FIG. 4. The requests are seen to be organized in ascending order according to their associated absolute sector numbers, as shown in table 1. Process requests 3 and 4, which are contiguous (Request 3 accesses sectors 16 and 17 while request 4 accesses sectors 18 and 19) have been concatenated and are therefor queued as a single request. Similarly, contiguous requests 9, 10 and 11 are concatenated for scheduling as a single function.

Figure 5:
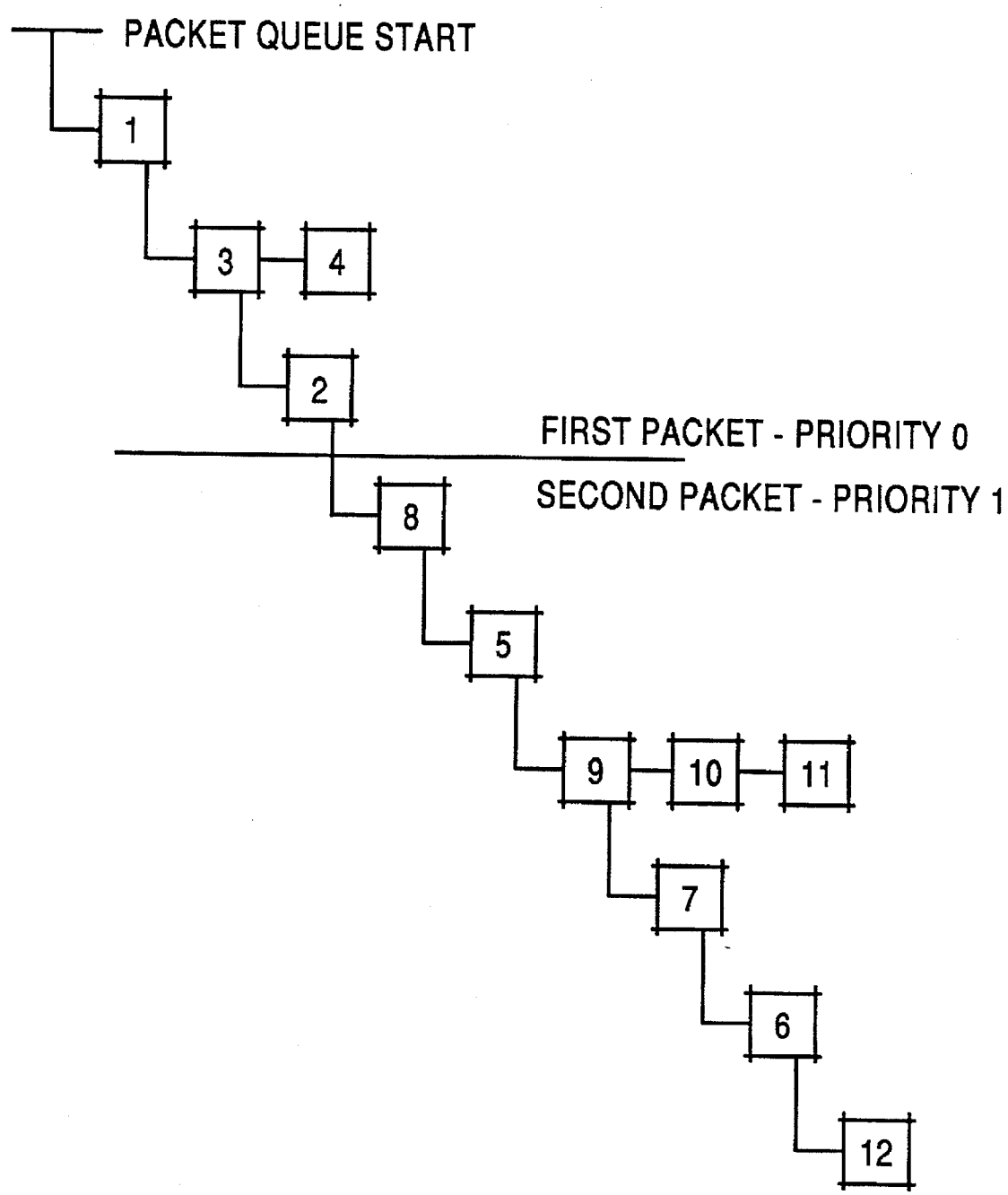
FIG. 5 illustrates the scheduling of the I/O functions shown in FIG. 4 within packets within a second queue in accordance with the present invention.

FIG. 5 illustrates the organization of process requests 1 through 12 in the second "execution" queue. The requests have been grouped into two packets, the first packet to be executed containing the requests having priority level 0, and the second packet including the requests having the lower priority level 1. It should be noted that request 3, having a priority level of 1 is included in the first packet. Process request 3 is included in the first packet since the concatenated function, consisting of requests 3 and 4, is treated as a single request having the priority level 0, the priority level of request 4.

Within the packets the requests are scheduled by cylinder number, and within cylinders by next-closest-in-time sequence. Functions 1 through 4, contained in the first packet, all access cylinder 0. Thus the order of execution of the functions within the first packet is determined solely by next-closest-in-time sequencing. Functions 3 and 4 are scheduled following function 1 since the sector associated with the start of function 3 (sector 16) is located closer in time to the end sector of function 1 (sector 1) than the sector associated with the start of function 2 (sector 2).

Although the sectors associated with functions 1 and 2 are physically separated by only one sector, non-contiguous functions cannot be executed during a single revolution of the disk when the separation between sectors is less than the function return time, which in this example is 3 milliseconds. At the disk revolution rate of 0.33 milliseconds per sector, a physical separation of ten sectors between successively scheduled, non-contiguous functions is required. The final function executed in the first packet, function 2, is executed following the completion of function 4.

The second packet includes all functions having priority level 1, sorted first by cylinder number and thereafter by next-closest-in-time sequence within the cylinders. Function 8, which accesses sector 17 of track 7 is queued as the first function of the second packet since it is closest in time following the completion of function 2, the last function queued in the first packet.

Following the completion of function 8, the disk drive heads would be positioned at sector 19. The function return time requires ten sectors, therefore the disk head will be positioned at sector 29 before another function can be executed. The closest function, to be placed in the queue behind function 8, is function 5 which accesses sector 39 of track 1. Following the execution of function 5, the disk heads will be located at sector 41. Adjusting for the function return time, the heads will be positioned at sector 2 before another function can be initiated. The concatenated functions 9, 10 and 11, which access sectors 8 through 13 of track 8, are scheduled to follow function 5. Function 7 is determined to follow function 11. Function 6, the last function associated with cylinder 0, follows function 7. Function 12, the only function on cylinder 1, is placed at the end of the queue.

Organized as shown in FIG. 5, the twelve functions require two seek operations and five disk rotations to complete. The first seek operation positions the read/write heads at cylinder 0. Functions 1, 3 and 4 are executed during the first revolution; functions 2, 8 and 5 during the second revolution; functions 9, 10, 11 and 7 during the third revolution; and function 6 during the fourth rotation. A seek to cylinder 1 and a fifth rotation are required to complete function 12.

Two seek operations and seven disk rotations would be required to execute the twelve functions under the elevator sweep method wherein the functions are sorted in ascending order by absolute sector number, as shown in FIG. 4. In accordance with the elevator sweep method, the first seek places the heads at cylinder 0. The first rotation executes function 1; the second rotation completes functions 2 through 5; the third, fourth and fifth rotations are required to complete functions 6, 7 and 8, respectively; and the sixth rotation executes functions 9, 10 and 11. The final seek and rotation complete function 12. Thus the method of the present invention reduces the time required to execute the twelve functions by two disk rotations or thirty-two milliseconds.

It can thus be seen that there has been provided by the present invention a method for scheduling process requests for access to a disk storage device which provides more efficient utilization of the disk storage devices than prior scheduling techniques. The method as described reduces the time required to execute a series of requests requiring access to a single or multiple platter disk drive.

Although the presently preferred embodiment of the invention has been described, it will be clear to those skilled in the art that the present invention is not limited to the specific embodiment described and illustrated and that numerous modifications and changes are possible without departing from the scope of the present invention. For example, the method is not limited in application to multiple-platter disk drives. The method can be utilized to optimize the use of single platter or single surface disk devices or disk arrays. The disk drive described employs movable read/write heads, however, the method can also be utilized to optimize operation of disk drives which include fixed heads for each track.

These and other variations, changes, substitutions and equivalents will be readily apparent to those skilled in the art without departing from the spirit and scope of the present invention. Accordingly, it is intended that the invention to be secured by Letters Patent be limited only by the scope of the appended claims.

What is claimed is:

1. In a computer system including a multiple-platter disk memory device, said disk memory device being divided into a plurality of disk cylinders comprising concentric rings occupying the same position in each platter wherein each ring is further divided into a plurality of sectors which define angularly spaced recording areas and having a disk access time, rotational latency, rotational distance, and function return time associated therewith, a method for scheduling process requests for access to said disk memory device, the steps comprising:

sorting said process requests in ascending/descending order by the disk cylinder numbers to which the requests desire access;

sorting said process requests within each cylinder in next-closest-in-time sequence;

wherein said step of sorting said process requests within a cylinder further comprises the steps of:

determining the rotational latencies between each pairing of process requests desiring access to said cylinder;

comparing said rotational latencies to the function return time of said disk device; and sorting said process requests desiring access to said cylinder such that successive process requests are separated by the minimum rotational latency which exceeds said function return time.

2. The method according to claim 1, further including the step of concatenating process requests desiring access to contiguous sectors within the same cylinder, said concatenated process requests being scheduled as a single process request.

3. In a computer system including a multiple-platter disk memory device, said disk memory device being divided into a plurality of disk cylinders comprising concentric rings occupying the same position in each platter wherein each ring is further divided into a plurality of sectors which define angularly spaced recording areas and having a disk access time, rotational latency, rotational distance, and function return time associated therewith, a method for scheduling process requests for access to said disk memory device, the steps comprising:

sorting said process requests in ascending order by the sector number to which the requests desire access;

grouping said sorted process requests into packets of requests, each of said packets including a predetermined maximum number of requests;

sorting said process requests within each packet in ascending/descending order by the cylinder number to which the requests desire access; and sorting said process requests within each cylinder within a packet in next-closest-in-time sequence.

4. The method according to claim 3, wherein:

each of said process requests has a priority level associated therewith; and each one of said packets includes process requests having the same priority levels.

5. The method according to claim 4, further including the step of concatenating process requests desiring access to contiguous sectors within the same cylinder, said concatenated process requests being sorted and grouped as a single process request having an associated priority level equivalent to the highest priority level of the concatenated requests.

6. The method according to claim 3, wherein said step of sorting process requests within a cylinder within a packet comprises the steps of:

determining the rotational latencies between each pairing of process requests within the packet desiring access to said cylinder;

comparing said rotational latencies to the function return time of said disk device; and sorting said process requests within the packet desiring access to said cylinder such that successive process requests are separated by the minimum rotational latency which exceeds said function return time.

7. In a computer system including a multiple-platter disk memory device, said disk memory device being divided into a plurality of disk cylinders comprising concentric rings occupying the same position in each platter wherein each ring is further divided into a plurality of sectors which define angularly spaced recording areas and having a disk access time, rotational latency, rotational distance, and function return time associated therewith, a method for scheduling process requests for access to said disk memory device, the steps comprising:

generating a first queue containing said process requests sorted in ascending order by the sector number to which the requests desire access; and generating a second queue wherein:

said sorted requests are grouped into packets, each of said packets including a predetermined maximum number of requests;

said process requests in each of said packets are sorted in ascending/descending order by the disk cylinder numbers to which the requests desire access; and said process requests within each cylinder are sorted in next-closest-in-time sequence.

* * * * *